US009290598B2

(12) United States Patent
Carlson et al.

(10) Patent No.: US 9,290,598 B2
(45) Date of Patent: *Mar. 22, 2016

(54) DIOXABORINANE CO-POLYMERS AND USES THEREOF

(71) Applicant: Empire Technology Development LLC, Wilmington, DE (US)

(72) Inventors: William B. Carlson, Seattle, WA (US); Gregory D. Phelan, Cortland, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 426 days.

This patent is subject to a terminal disclaimer.

(21) Appl. No.: 13/749,291

(22) Filed: Jan. 24, 2013

(65) Prior Publication Data

US 2013/0261274 A1 Oct. 3, 2013

(30) Foreign Application Priority Data

Mar. 29, 2012 (WO) ................ PCT/US2012/031220

(51) Int. Cl.
*C08F 224/00* (2006.01)
*C08F 230/04* (2006.01)
*C08F 230/06* (2006.01)
*C08F 220/18* (2006.01)

(52) U.S. Cl.
CPC ............. *C08F 224/00* (2013.01); *C08F 230/04* (2013.01); *C08F 230/06* (2013.01); *C08F 2220/1833* (2013.01)

(58) Field of Classification Search
CPC ............. C08K 5/55; C07F 5/02; A10N 55/08
See application file for complete search history.

(56) References Cited

U.S. PATENT DOCUMENTS

| 3,025,274 | A | | 3/1962 | Thomas, et al. |
|---|---|---|---|---|
| 3,180,730 | A | | 4/1965 | Klupfel, et al. |
| 3,234,191 | A | | 2/1966 | Woods, et al. |
| 3,658,520 | A | | 4/1972 | Brantly et al. |
| 4,608,440 | A | * | 8/1986 | Saischek et al. ............... 504/152 |
| 4,720,432 | A | | 1/1988 | VanSlyke et al. |
| 4,778,833 | A | | 10/1988 | Van Der Drift et al. |
| 5,034,296 | A | | 7/1991 | Ong et al. |
| 5,055,366 | A | | 10/1991 | Yu et al. |
| 5,061,569 | A | | 10/1991 | VanSlyke et al. |
| 5,149,609 | A | | 9/1992 | Yu et al. |
| 5,521,165 | A | | 5/1996 | Warren et al. |
| 5,589,320 | A | | 12/1996 | Ohnishi et al. |
| 5,633,236 | A | | 5/1997 | Warren et al. |
| 5,759,709 | A | | 6/1998 | Doi et al. |
| 5,895,692 | A | | 4/1999 | Shirasaki et al. |
| 6,149,927 | A | | 11/2000 | Ghosh |
| 6,291,549 | B1 | | 9/2001 | Mechtel et al. |
| 6,361,886 | B2 | | 3/2002 | Shi et al. |
| 6,365,066 | B1 | | 4/2002 | Podszun et al. |
| 6,395,826 | B1 | | 5/2002 | Mager et al. |
| 6,462,102 | B1 | | 10/2002 | Yamamori et al. |
| 6,465,115 | B2 | | 10/2002 | Shi et al. |
| 6,565,996 | B2 | | 5/2003 | Hatwar et al. |
| 6,596,415 | B2 | | 7/2003 | Shi et al. |
| 6,753,397 | B2 | | 6/2004 | Nakamura et al. |
| 6,958,366 | B2 | | 10/2005 | Tokunaga et al. |
| 7,125,633 | B2 | | 10/2006 | Mishra et al. |
| 8,546,617 | B1 | * | 10/2013 | Carlson et al. ............... 568/6 |
| 2004/0106004 | A1 | | 6/2004 | Li |
| 2005/0013939 | A1 | | 1/2005 | Vinden et al. |
| 2005/0184287 | A1 | | 8/2005 | Herron et al. |
| 2005/0233165 | A1 | | 10/2005 | Ido et al. |
| 2007/0049778 | A1 | | 3/2007 | Nomura et al. |
| 2008/0286566 | A1 | | 11/2008 | Prakash |
| 2008/0293848 | A1 | | 11/2008 | Tomko et al. |
| 2009/0253879 | A1 | | 10/2009 | Nishio et al. |
| 2010/0168851 | A1 | | 7/2010 | Vanderbilt et al. |
| 2010/0190884 | A1 | | 7/2010 | Gillard et al. |

(Continued)

FOREIGN PATENT DOCUMENTS

| GB | 0 901 567 | 7/1962 |
|---|---|---|
| JP | 63-003051 | 1/1988 |

(Continued)

OTHER PUBLICATIONS

Bebernitz, Gregory et al., Reduction in Glucose Levels in STZ Diabetic Rats by 3-(2,2-Dimethyl-1-oxopropyl)benzoic Acid: A Prodrug Approach for Targeting the Liver, Journal of Medicinal Chemistry 44(4), 2001, pp. 512-523.
Dandin, Marc et al., "Optical filtering technologies for integrated fluorescence Sensors," 2007, Lab Chip 7, pp. 955-977.
Hwang, J. et al., "Synthesis and characterization of photoconducting non-linear optical polymers containing indole-benzoxazole moiety," 2001, Polymer 42, pp. 3023-3031.
International Search Report and Written Opinion for Intl. Pat. Appln. No. PCT/US2012/031220, mailed on Jul. 6, 2012, 12 pp.
Katsuki, K. et al., "Preparation of Carbazole Polymer Thin Films by Electron-Assisted Deposition of 3-(N-Carbazolyl)propyl Acrylate" Jpn. J. Appl. Phys. 44, No. 6A, 2005, pp. 4182-4186.
Kimyonok, Alpay et al., "Norbornene-Based Copolymers with Iridium Complexes and Bis(carbazolyl)fluorene Groups in Their Side-Chains and Their Use in Light-Emitting Diodes," 2007 Chem. Mater., 19, pp. 5602-5608.
Madani, A. et al. "Experimental study of liquid-crystal alignment on a surface relief grating," 2006, Laser Physics, vol. 16, No. 8, pp. 1197-1201.

(Continued)

*Primary Examiner* — Hannah Pak
(74) *Attorney, Agent, or Firm* — Foley & Lardner LLP

(57) ABSTRACT

A co-polymer includes a polymerization product of: a first monomer: and a second monomer represented by $(R^1O)(R^2O)B\text{-}L\text{-}X^1\text{---}PG^2$ where: L is absent, or is alkylenyl, alkenylenyl, or arylene, wherein the alkylenyl and alkenylenyl are optionally interrupted with one or more oxygen or sulfur atoms; $X^1$ is absent, or is amino, oxo, thio, or phosphino; $PG^2$ is a polymerizable group; $R^1$ and $R^2$ are independently H, alkyl, alkenyl, aryl, $C(O)R^3$, $C(O)OR^3$, $C(O)NHR^3$, or $R^1$ and $R^2$ together with the oxygen atoms to which they are bonded join to form a 5- or 6-membered ring; and $R^3$ is H, alkyl, alkenyl, or aryl, wherein the alkyl and alkenyl are optionally interrupted with one or more oxygen or sulfur atoms.

19 Claims, No Drawings

(56) References Cited

U.S. PATENT DOCUMENTS

| | | |
|---|---|---|
| 2010/0222452 A1 | 9/2010 | Kawahara |
| 2013/0059210 A1 | 3/2013 | Yu et al. |

FOREIGN PATENT DOCUMENTS

| | | |
|---|---|---|
| JP | 4172456 | 6/1992 |
| JP | 2006-124639 | 5/2006 |
| JP | 2006257048 | 9/2006 |
| JP | 2006-309120 | 11/2006 |
| WO | WO-95/05081 | 2/1995 |
| WO | WO-03/084968 | 10/2003 |

OTHER PUBLICATIONS

Matsubara, H. et al., "A New Series of Liquid Crystalline Side-chain Polymers Containing Boron Atoms," 1989, Chemistry Letters, vol. 8, pp. 1519-1522.
Matsubara, H. et al., "Syntheses and Properties of New Liquid-Crystalline Polymers Having 1,3,2-Dioxaborinane Pendants," 1993, Bulletin of Chemical Society of Japan, vol. 66, No. 2, pp. 578-584.
Meinhold, R. H. "Aromatic boronic acids as wood preservatives, including solid state NMR studies,"1993, Ind. Res. Ltd. Rep. (89), 41 pp.
Miyaura, N. et al. "Stereoselective synthesis of arylated (E)-alkenes by the reaction of alk-1 enylboranes with aryl halides in the presence of palladium catalyst," 1979, Chemical Communications, pp. 866-867.
Miyaura, N. et al., "Palladium-Catalyzed Cross-Coupling Reactions of Organoboron Compounds," 1995, Chemical Reviews vol. 95, No. 7, pp. 2457-2483.
Mulvaney, J.E. et al., "Preparation of Vinyl Boronate Copolymers and Reactions," 1982, Journal of Polymer Science: Polymer Chemistry Edition, vol. 20, pp. 1949-1952.
Pietsch, Christian et al., "PMMA based soluble polymeric temperature sensors based on UCST transition and solvatochromic dye" 2010, Polymer Chemistry 1, 1005-1008.
Shirota et al., "Charge Carrier Transporting Molecular Materials and Their Applications in Devices," 2007, Chem. Rev., No. 107, pp. 953-1010.
Suzuki, A., "Recent advances in the cross-coupling reactions of organoboron derivatives with organic electrophiles," Journal Organomet. Chem., 1999, vol. 576, pp. 147-168.
Chris Shuk Kwan Mak et al., "Electroluminescence from Metal-Containing Polymers and Metal Complexes with Functional Ligands. Highly Efficient OLEDs with Phosphorescent Materials," 2008, Highly Efficient OLEDs with Phosphorescent Materials, Ed. Hartmut Yersin, Chapter 10, pp.329-362.
"SIGMA-Aldrich," (2008) accessed at https://web.archive.org/web/20090113184900/http://www.sigmaaldrich.com/materials-science/material-science-products.html?TablePage=20202172, accessed on Feb. 4, 2015, 6 pages.
Non-final Office Action received for U.S. Appl. No. 13/761,576, filed Dec. 18, 2014.
Aldrich Chemistry "Handbook of Fine Chemicals," Australian/ New Zealand Edition, 2009-2010, pp. 71, 569, 1515, 2079 and 2706.
Avantor Material Safety Data Sheet for Sodium Benzoate, Version 1, Revision date Dec. 12, 2011 as downloaded on Apr. 2, 2013 from http://www.avantormaterials.com/documents/MSDS/usa/English/S2930_msds_us_cov_Default.pdf, 6 pp.
Biobor Information Sheet, retrieved from http://webcache.googleusercontent.com/search?q=cache:ArtSDCpCY3gJ:www.seriouslostfan.com/topics/Biobor posted on Jul. 27, 2010, pp. 1-2.
Bogdal, D., et al., "Halogenation of carbazole and other aromatic compounds with hydrohalic acids and hydrogen peroxide under microwave irradiation," Green Chem., vol. 6, pp. 110-113 (2004).
Butler, D.N., and Soloway, A. H., "Attempted Synthesis of 2,4-Dihydroxy-4,3-borazaropyridine. Preparation of Aminoalkylboronic Acids," Journal of Medicinal Chemistry, vol. 9, No. 3, pp. 362-365 (May 1966).

Butler, D.N., and Soloway, A. H., "Monohydroboration of N-Alkenylcarbamates; Preparation of Aminoalkylboronic Acids," Chemical Communications, No. 15, p. 333 (1965).
CAS RN 1141927-92-5, STN Entry Date May 3, 2009.
CAS RN 54383-83-4, STN Entry Date Nov. 16, 1984.
CAS RN 84063-31-0, STN Entry Date Nov. 16, 1984.
CAS RN 84063-33-2, STN Entry Date Nov. 16, 1984.
CAS RN 886974-32-9, STN Entry Date Jun. 6, 2006.
CAS RN 914100-80-4, STN Entry Date Nov. 28, 2006.
David, Serge, "The anomalous reactivity of the bis(dibutylstannylene) acetal of pentaerythritol: a case of triple activation," 2001, Carbohyd. Res., vol. 331, pp. 327-329.
Findley, T., et al., "Epoxidation of unsaturated fatty materials with peracetic acid in glacial acetic acid solution," J. Am. Chem. Soc., vol. 67, No. 3, pp. 412013414 (1945).
International Search Report and Written Opinion for international application No. PCT/US2012/031220, mailed on Jul. 6, 2012, pp. 12.
International Search Report and Written Opinion of the International Searching Authority for International Application No. PCT/US2012/48996 mailed Oct. 16, 2012 (9 pages).
International Search Report and Written Opinion received for PCT/US/2012/030315 mailed Jun. 6, 2012.
Kartal, S. Nami et al., "Laboratory evaluation of boron-containing quaternary ammonia compound, didecyl dimethyl ammonium tetrafluoroborate (DBF) for inhibition of mold and stain fungi," (2005), European Journal of Wood and Wood Products, vol. 63, No. 1, pp. 73-77.
Kartal, S. Nami et al., "Laboratory evaluation of boron-containing quaternary ammonia compound, didecyl dimethyl ammonium tetrafluoroborate (DBF) for control of decay and termite attack and fungal staining of wood," (2006) Holz als Roh- and Werkstoff, vol. 64, pp. 62-67.
Mallinckrodt Baker, Inc., "Material Safety Data Sheet: Sodium Benzoate," accessed at http://web.archive.org/web/20110514220854/http://www.jtbaker.com/msds/englishhtml/s2930.htm, effective Date: Aug. 17, 2009, pp. 1-4.
Murata, M., et al., "Synthesis of benzylboronates via palladium catalyzed borylation of benzyl halides with pinacolborane," Synthetic Commun, vol. 32, No. 16, pp. 2513-2517 (2002).
Non-Final Office Action for U.S. Appl. No. 13/554,783, mailed on Mar. 26, 2013, 11 pp.
Non-final Office Action received for U.S. Appl. No. 13/761,576 dated Aug. 13, 2014.
Notice of Allowance for U.S. Appl. No. 13/554,783, mailed on Jun. 13, 2013, 21 pp.
Pesticide Products, "Timbertreat b wood preservative booster," Biobor jf, PAN Pesticides Database, accessed at http://www.pesticideinfo.org/Detail_Product.jsp?REG_NR=06521700001&DIST_NR=060061, accessed on Sep. 26, 2014, pp. 1-3.
Rasset-Deloge, C., et al., "ChemInform: Synthesis of Vinylboronates 3B2-Substituted by an Electron-Withdrawing Group: A New Class of Electron-Poor Olefins," ChemInform, vol. 24, No. 2, pp. 285-290 (Jan. 12, 1993).
Rose Mill Chemicals & Lubricants, "Material Safety Data Sheet: Borax 5 mol," Revised Apr. 4, 2009, retrieved from http://www.rosemill.com, 2 pages.
Schunicht, C., et al., "ChemInform: Microgel-Supported Oxazaborolidines: Novel Catalysts for Enantioselective Reductions," Chemlnform, vol. 56, No. 12, pp. 1693-1699 (Jun. 27, 2000).
Science Lab, "Material Safety Data Sheet: Pentaerythritol MSDS," Updated Jun. 9, 2012, retrieved from: http://www.sciencelab.com/msds.php?msdsId=9926416, 5 pages.
Sigma-Aldrich Co., "Material Safety Data Sheet: Sample Diluent IGM," dated Apr. 26, 2002, 1 page.
Thevenon, Marie-France et al., "High performance tannin resin-boron wood preservatives for outdoor end-uses," European Journal of Wood Products, (Nov. 2009), vol. 67, No. 1, pp. 89-93.
Voloshin, Y.Z. et al., "Application of the allylboration reaction of terminal acetylenes with allyldihaloboranes for the preparation of capping agents for the synthesis of precursors of polymeric iron(II) clathrochelates," Russian Chemical Bulletin, vol. 55, No. 11, pp. 1971-1981 (Nov. 2006).

(56) References Cited

OTHER PUBLICATIONS

Wulff, G., et al., "Enzyme-Analogue Built Polymers, 23. Influence of the Structure of the Binding Sites on the Selectivity for Racemic Resolution," Die Makromol. Chem., vol. 188, No. 4, pp. 741-748 (Apr. 1987).

Wulff, G., et al., "Über enzymanalog gebaute polymer, 16. Über den Einfluβ der flexibilität der haftgruppen auf die racemattrennungsfähigkeit," Die Makromolekulare Chemie, vol. 183, No. 10, pp. 2469-2477 (Oct. 18, 1982).

Wulff, G., et al., "Über enzymanalog gebaute Polymere, III. Zur Synthese von polymerisierbaren D-Glycerinsaurederivaten," Chemische Berichte, vol. 107, No. 10, pp. 3364-3376 (Oct. 1974).

Yalinkilic, M.K., et al., "Enhancement of the biological resistance of wood by phenylboronic acid treatment," Journal of Wood Science, vol. 44, Issue 2, pp. 152-157 (Apr. 1998).

Yang, C., et al., "Alkylboronic Esters from Copper-Catalyzed Borylation of Primary and Secondary Alkyl Halides and Pseudohalides," Angewandte Chemie International Edition, vol. 51, No. 2, pp. 528532 (Jan. 9, 2012).

Jäkle, F., "Borylated Polyolefins and their Applications," Journal of Inorganic and Organometallic Polymers and Materials (Sep. 2005), vol. 15, Issue 3, pp. 293-307.

Shin, Jihoon, "Controlled functionalization of crystalline polyolefins and their application in soluble polymer support" (2009), UNLV Theses/Dissertations/Professional Papers/Capstones, pp. 27 & 50.

\* cited by examiner

DIOXABORINANE CO-POLYMERS AND USES THEREOF

CROSS-REFERENCE TO RELATED APPLICATIONS

This application claims the benefit of International Application Serial No. PCT/US2012/031220, filed on Mar. 29, 2012, the entire disclosure of which is incorporated herein by reference for any and all purposes in its entirety as if fully set forth herein.

FIELD

The present technology relates to dioxaborinane co-polymers, dioxaborinane co-polymer intermediates, and uses thereof, as components of an electronic system.

BACKGROUND

The following description is provided to assist the understanding of the reader. None of the information provided or references cited is admitted to be prior art to the present technology.

Many electronic devices include a user interface that allows people to interact with these devices. The increasingly convenient nature of user interfaces, such as touch-based displays, has made personal electronics more accessible and appealing to larger markets. Further, there is a growing demand to develop the next generation of user interfaces from flexible or stretchable materials in order to incorporate them into a greater variety of electronic devices, such as displays, sensors, robotics, medical devices, and video games. The development of improved user interfaces, such as touch-based displays, depends in part upon the discovery of useful polymer and co-polymer materials from which they are made.

Many polymers and co-polymers have shortcomings that limit or preclude their use in the next-generation of electronic user interfaces. For example, styrene-based polymers commonly succumb to photo-oxidative yellowing and embrittlement. As such, styrene-based polymers and co-polymers are generally unsuitable for use in user interfaces that will be exposed to light or air. Alternatively, acrylic polymers are more robust, better suited to light or air, and thus have been more extensively incorporated into electronic devices for indoor and outdoor use. For example, DR1-methacrylate (2-{N-ethyl-N-[4-(4-nitrophenylazo)phenyl]amino}ethyl methacrylate) has been incorporated into polymers and co-polymers for sensor and optical user interface technologies. Acrylics have also been used as host materials to functionalize luminescent molecules for applications related to user interfaces such as organic light-emitting diodes (OLEDs). Accordingly, a greater variety of resilient acrylic polymers and co-polymers, and methods of making the same, are needed to produce improved materials for use in the next-generation of electronic materials and user interfaces.

SUMMARY

The present technology provides for co-polymers made from monomers having a pendant dioxaborinane moiety and a polymerizable moiety. The co-polymers may be used to create electronic articles such as flexible or stretchable user interfaces. Optionally, various "active moieties" such as hole transport agents, electron transport agents, or luminescent agents may be coupled (i.e., attached) to the acrylic co-polymer backbone through a chemical reaction, for example, that displaces the dioxaborinane moiety.

The monomers having a pendant dioxaborinane moiety may first be polymerized before one or more active moieties are coupled to the resulting acrylic co-polymer backbone. Alternatively, one or more active moieties may first be coupled to the monomer to displace the pendant dioxaborinane moiety prior to the polymerization step. In some embodiments, the coupling is achieved via a Suzuki or a Chan-Lam coupling reaction.

The monomers may be co-polymerized with other monomers, for example, to adjust polymer properties for the required application. Monomers such as lauryl methacrylate, for example, may be used to lower the glass transition temperature and render the co-polymer more flexible and stretchable. Alternatively, co-polymerization with monomers such as adamantyl methacrylate, for example, may be used increase the glass transition temperature and render the co-polymer harder and more glass-like. Other monomers may be co-polymerized with monomers having a pendant dioxaborinane moiety to add additional features, such as crosslinking capabilities.

In one aspect, a co-polymer having a boronate pendant group is provided that includes a polymerization product of a first monomer having a polymerizable group $PG^1$ with a second monomer represented by Formula I:

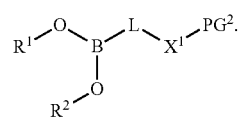

I

In Formula I, L may be absent, alkylenyl, alkenylenyl, or arylene, where the alkylenyl and alkenylenyl are optionally interrupted with one or more oxygen or sulfur atoms; $X^1$ may be absent, amino, oxo, thio, or phosphino; $PG^2$ is a polymerizable group; $R^1$ and $R^2$ are independently H, alkyl, alkenyl, aryl, $C(O)R^3$, $C(O)OR^3$, $C(O)NHR^3$, or $R^1$ and $R^2$ together with the oxygen atoms to which they are bonded join to form a 5- or 6-membered ring; and $R^3$ is H, alkyl, alkenyl, or aryl, where the alkyl and alkenyl are optionally interrupted with one or more oxygen or sulfur atoms; with the proviso that if L and $X^1$ are both absent, and $R^1$ and $R^2$ form a 5- or 6-membered ring, then $PG^2$ is not a vinyl group.

In some embodiments, the $PG^1$ group of the first monomer is an acrylyl, methacrylyl, epoxyl, isocyanyl, styrenyl, vinyl, oxyvinyl, thiovinyl, ketovinyl, ketoalkyl, ketoalkoxy, ketoaryl, or cycloalkenyl group.

In another aspect, a co-polymer as represented by Formula II is provided:

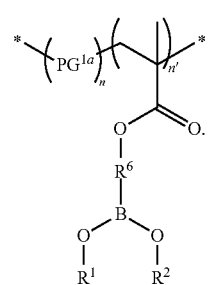

II

In Formula II, $PG^{1a}$ is the polymerization product of the first monomer; $R^6$ is an alkylene or arylene group; and n and n' represent the repeat units of the co-polymer. $R^1$ and $R^2$ are as described above for Formula I.

In another aspect, an article incorporating any of the above co-polymers is provided where the article is a component of an electronic system. For example, the electronic system can be a display, sensor, medical device, audio device, video device, gaming device, or robotic device. In other embodiments, the article is a user interface.

In another aspect, a process is provided of preparing any of the above co-polymers. The process includes forming a first co-polymer having a boronate pendant group by polymerizing a first monomer having a polymerizable group $PG^1$, where the $PG^1$ group is as described above, with a second monomer represented by Formula I

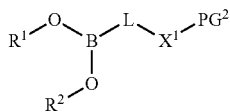

I

In Formula I, L is absent, or is alkylenyl, alkenylenyl, or arylene, optionally interrupted with one or more oxygen or sulfur atoms; $X^1$ is absent, or is amino, oxo, thio, or phosphino; $PG^2$ is a polymerizable group; $R^1$ and $R^2$ are independently H, alkyl, alkenyl, aryl, —C(O)$R^3$, —C(O)O$R^3$, —C(O)NH$R^3$, or $R^1$ and $R^2$ together with the oxygen atoms to which they are bonded join to form a 5- or 6-membered ring; $R^3$ is H, alkyl, alkenyl, or aryl optionally interrupted with one or more oxygen or sulfur atoms; and the boronate pendant group is represented by Formula III:

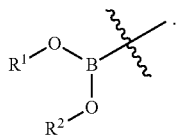

III

In Formula III, $R^1$ and $R^2$ are as described above for Formula I.

In another aspect, a process is provided for preparing a co-polymer. The process includes providing a first monomer having a polymerizable group $PG^1$; and providing a second monomer represented by Formula I

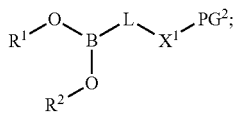

I where L may be absent, or is alkylenyl, alkenylenyl, or arylene, optionally interrupted with one or more oxygen or sulfur atoms; $X^1$ is absent, or is amino, oxo, thio, or phosphino; $PG^2$ is a polymerizable group; $R^1$ and $R^2$ are independently H, alkyl, alkenyl, aryl, —C(O)$R^3$, —C(O)O$R^3$, —C(O)NH$R^3$, or $R^1$ and $R^2$ together with the oxygen atoms to which they are bonded join to form a 5- or 6-membered ring; $R^3$ is H, alkyl, alkenyl, or aryl optionally interrupted with one or more oxygen or sulfur atoms; and contacting the second monomer with a compound represented by Formula IV

IV where $R^4$ is alkyl, alkenyl, aryl, or heteroaryl; and G is a leaving group, such as Cl, Br, I, or —OSO$_2$CF$_3$, and where the B(O$R^1$)(O$R^2$) group from the second monomer is displaced by the $R^4$ group to form a third monomer represented by Formula V

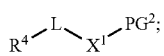

V and polymerizing the third monomer represented by Formula V with the first monomer having a polymerizable group $PG^1$ to form the co-polymer.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

The illustrative embodiments described in the detailed description and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain, branched chain, or cyclic alkyl groups having 1 to 24 carbons or the number of carbons indicated herein. In some embodiments, an alkyl group has from 1 to 16 carbon atoms, from 1 to 12 carbons, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the alkyl groups may be substituted alkyl groups.

Cycloalkyl groups are cyclic alkyl groups having from 3 to 10 carbon atoms. In some embodiments, the cycloalkyl group has 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above. In some embodiments, the cycloalkyl groups are substituted cycloalkyl groups. Representative substituted alkenyl groups may be mono-substituted or substituted more than once, such as, but not limited to, mono-, di- or tri-substituted with substituents such as those listed above. Representative substituted alkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Thus, alkenyl groups have from 2 to 24 carbon atoms, and typically from 2 to 10 carbons or, in some embodiments, from 2 to 8, 2 to 6, or 2 to 4 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others. Representative substituted alkenyl groups may be mono-substituted or substituted more than once, such as, but not limited to, mono-, di- or tri-substituted with substituents such as those listed above.

Aryl groups are cyclic aromatic hydrocarbons that do not contain heteroatoms. Thus aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once, such as, but not limited to, 2-, 3-, 4-, 5-, or 6-substituted phenyl or naphthyl groups, which may be substituted with groups including, but not limited to, amino, alkoxy, alkyl, cyano, and/or halo. In some embodiments, aryl is phenyl or naphthyl. In certain embodiments, aryl is phenyl.

Heteroaryl groups include an aromatic ring containing, for example, 5 to 12, or 5 to 10 atoms including one or more heteroatoms (e.g., 1, 2, 3 or 4 heteroatoms) selected from N, O and S and with the remaining ring atoms being carbon. Heteroaryl groups do not contain adjacent S and O atoms. Unless otherwise indicated, heteroaryl groups may be bound to the parent structure by a carbon or nitrogen atom, as valency permits. For example, "pyridyl" includes 2-pyridyl, 3-pyridyl and 4-pyridyl groups, and "pyrrolyl" includes 1-pyrrolyl, 2-pyrrolyl and 3-pyrrolyl groups. Heteroaryl groups may be monocyclic or polycyclic (e.g., bicyclic, tricyclic). In some embodiments, a heteroaryl group is monocyclic. Examples include pyrrole, pyrazole, imidazole, triazole (e.g., 1,2,3-triazole, 1,2,4-triazole, 1,2,4-triazole), tetrazole, furan, isoxazole, oxazole, oxadiazole (e.g., 1,2,3-oxadiazole, 1,2,4-oxadiazole, 1,3,4-oxadiazole), thiophene, isothiazole, thiazole, thiadiazole (e.g., 1,2,3-thiadiazole, 1,2,4-thiadiazole, 1,3,4-thiadiazole), pyridine, pyridazine, pyrimidine, pyrazine, triazine (e.g., 1,2,4-triazine, 1,3,5-triazine) and tetrazine. In some embodiments, more than one ring of a polycyclic heteroaryl group are aromatic. Examples include indole, isoindole, indazole, benzoimidazole, benzotriazole, benzofuran, and benzoxazole.

The terms "alkylene," "alkenylene," and "arylene," alone or as part of another substituent, means a divalent radical derived from an alkyl, cycloalkyl, alkenyl, aryl, or heteroaryl group, respectively, as exemplified by —CH$_2$CH$_2$CH$_2$CH$_2$—. For alkylene, alkenyl, or aryl linking groups, no orientation of the linking group is implied.

The term "amine" (or "amino") as used herein refers to —NHR and —NRR' groups, where R, and R' are independently hydrogen, or a substituted or unsubstituted alkyl, alkenyl, alkynyl, cycloalkyl, aryl or aralkyl group as defined herein. Examples of amino groups include —NH$_2$, methylamino, dimethylamino, ethylamino, diethylamino, propylamino, isopropylamino, phenylamino, benzylamino, and the like.

The term "oxo" refers to a divalent oxygen group. While the term includes doubly bonded oxygen, such as that found in a carbonyl group, as used herein, the term oxo explicitly includes singly bonded oxygen of the form —O— which is part of a polymer backbone. Thus, an oxo group may be part of an ether linkage (—O—), an ester linkage (—O—C(O)—), a carbonate linkage (—O—C(O)O—), a carbamate linkage (—O—C(O)NH— or —O—C(O)NR—), and the like.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alkenylene, alkynylene, arylene, hetero moieties. Additionally, the substituents may be pendent from, or integral to, the carbon chain itself.

The term "leaving group" or "LG" as used herein, is well known among those of skill in the art as a labile substituent of a compound that is readily displaced from the compound. Leaving groups, as used herein, are described in *March's Advanced Organic Chemistry*, (John Wiley, and Sons, 5$^{th}$ Edition, 2001), and encompass the group consisting of a halo or O(SO$_2$)R$^A$; where each R$^A$ is, independently, alkyl or aryl. In certain embodiments, each leaving group is, independently, a chloro; bromo; iodo;

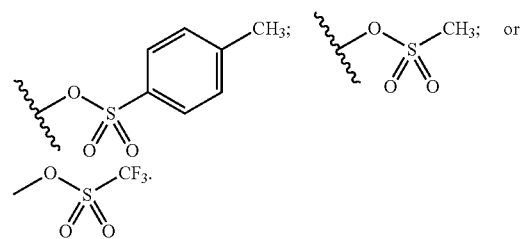

The monomers and co-polymers can be prepared according to synthetic procedures including via a Suzuki reaction, or a Chan-Lam reaction. As used herein, a Suzuki reaction refers to a carbon-carbon coupling of two reactants in which one reactant is a boronic acid or boronic ester moiety. The Suzuki reaction was described by N. Miyaura and A. Suzuki; *Chem. Rev.*; 1995, 95, 2457-2483; and A. Suzuki, *J. Organomet. Chem.*, 1999, 576, 147-168.

Typically, the Suzuki reaction may be carried out in the presence of a palladium catalyst such as palladium(II) acetate, tetrakis(triphenylphosphine)palladium (0), palladium on activated charcoal or dichloro[1,1'-bis(diphenylphosphino)ferrocene]palladium(II), in an aprotic polar solvent (for example acetonitrile, N,N-dimethylformamide, dimethoxyethone or tetrahydrofuran) or a protic polar solvent (for example n-propanol, iso-propanol) or a mixture of these solvents with water. The volume of solvent used may be, for example, from approximately 1 to approximately 30 times the quantity of boronic acid or boronic ester used. The palladium catalyst may contain a ligand selected from: a triphenylphosphine, a tri-o-tolylphosphine, a tri-m-tolylphosphine or a tri-p-tolylphosphine. In some embodiments, the catalyst is palladium(II) acetate or palladium on carbon. The reaction is generally carried out in the presence of an inorganic base such as potassium carbonate, sodium carbonate, caesium carbonate, sodium hydroxide or potassium hydroxide or in the presence of a tertiary amine such as triethylamine or diisopropylethylamine. In certain embodiments, the inorganic base is potassium carbonate or potassium hydroxide. The Suzuki reaction is typically carried out under an inert atmosphere, for example, under an argon or nitrogen atmosphere. The reaction mixture may be conducted at a temperature in the range from 60° C. to 110° C., for 2 minutes to 24 hours. Quenching with an acidic medium, for example, in the presence of HCl, is often carried out. One skilled in the art will be able to modify these conditions, in particular by applying the variants of the Suzuki reaction which are described in the literature.

The monomers and co-polymers can also be prepared according to the wide variety of other chemical reactions involving boronic acids or boronic esters as is generally known to one of ordinary skill in the art. For example, the Chan-Lam coupling, which allows aryl or alkenyl carbon-heteroatom bond formation via an oxidative coupling of arylboronic acids or esters with N—H or O—H containing compounds in air. Illustrative N—H or O—H containing substrates include phenols, amines, anilines, amides, imides, ureas, carbamates, phosphonate esters, and sulfonamides. The Chan-Lam coupling may be induced by a stoichiometric amount of copper(II) or a catalytic amount of copper catalyst which can be reoxidized by atmospheric oxygen. Thus, monomers or co-polymers having an aryl-substituted dioxaborinane moiety or an alkenyl-substituted dioxaborinane moiety can be used to make the corresponding monomers or co-polymers having aryl or alkenyl carbon-heteroatom bonds.

The monomers and co-polymers can also be prepared according to the Liebeskind-Srogl reaction by coupling the boronic ester with a thiol ester to yield a ketone product. Alternatively, the boronic ester containing monomers and co-polymers may also be may be used as nucleophiles in the metal catalyzed conjugate addition to α,β-unsaturated electrophiles, or they may be homologated with additional carbon units. For example, boronate alkyl migration (e.g., the Petasis reaction) can be used to homologate boronic ester containing monomers and co-polymers. In boronic ester homologization an alkyl group (e.g., from an alkyllithium species) bonds to boron of a boronate complex and then shifts from boron to carbon, leading to insertion of an optionally substituted $CH_2$ group into the C—B bond of the original boronic ester containing monomers and co-polymers.

The term "active moiety," as described herein, includes hole transport agents, electron transport agents, luminescent agents, sensing molecules, and high index materials, as they are known to one of ordinary skill, and as described below. In some embodiments, the active moiety may be derivatized (e.g., halogenated) to facilitate coupling (e.g., Suzuki coupling) to the monomer or co-polymer.

The term "hole transport agent" or "hole transport compound," as described herein, may be a compound, or a structural unit, that includes at least one trivalent nitrogen atom bonded only to carbon atoms, at least one of which is a member of an aryl or heteroaryl ring. Hole transport compounds may include an aromatic tertiary amine such as a monoarylamine, diarylamine, triarylamine, or a polymeric arylamine. Exemplary arylamines and heteroarylamines are disclosed in U.S. Pat. Nos. 3,180,730; 3,658,520; 4,720,432; 5,061,569; 5,034,296; 5,055,366; 5,149,609; 5,589,320; 5,759,709; 5,895,692; and 7,125,633 as well as U.S. Patent Publication Nos. 2005/0184287 and 2008/0286566. Hole transport compounds and structural units are also described by Shirota et al., Chem. Rev., 2007, 107, 953-1010.

A variety of aryl or heteroaryl groups can be used in the hole transporting agent arylamines and heteroarylamines. Examples of aryl and heteroaryl groups, which can be optionally substituted, are known in the art and include benzene, naphthalene, anthracene, phenanthrene, perylene, tetracene, pyrene, benzpyrene, chrysene, triphenylene, acenaphtene, fluorene, and those derived therefrom. Examples of heteroaryls include furan, benzofuran, thiophene, benzothiophene, pyrrole, pyrazole, triazole, imidazole, oxadiazole, oxazole, thiazole, tetrazole, indole, carbazole, pyrroloimidazole, pyrrolopyrazole, pyrrolopyrrole, thienopyrrole, thienothiophene, furopyrrole, furofuran, thienofuran, benzoisoxazole, benzoisothiazole, benzoimidazole, pyridine, pyrazine, pyridazine, pyrimidine, triazine, quinoline, isoquinoline, cinnoline, quinoxaline, phenanthridine, benzoimidazole, perimidine, quinazoline, quinazolinone, azulene, and combinations thereof. The aryl or heteroaryl groups may be substituted and may include fused ring systems.

Hole transport agents, as described herein, may further include hydrocarbons such as anthracenes and other polycyclic aromatic hydrocarbons without amino substituents. For example, the use of anthracenes as hole-transporting materials has been described in U.S. Pat. Nos. 6,465,115; 6,361,886; 6,565,996; US2005/0233165 and US2007/0049778. Other types of non-amino substituted hydrocarbons suitable for hole transport layers have been disclosed in U.S. Pat. No. 6,596,415. In one embodiment, the hole transport agent includes at least one spiro moiety. Spiro moieties in hole transport agents are described in, for example, US Patent Publication No. 2004/0106004.

Illustrative hole transport compounds, include, but are not limited to, N,N'-bis(naphthalen-1-yl)-N,N'-bis(phenyl)-benzidine, N,N'-bis(naphthalen-2-yl)-N,N'-bis(phenyl)-benzidine, N,N'-bis(3-methylphenyl)-N,N'-bis(phenyl)-benzidine, N,N'-bis(3-methylphenyl)-N,N'-bis(phenyl)-9,9-spirobifluorene, N,N'-bis(naphthalen-1-yl)-N,N'-bis(phenyl)-9,9-spirobifluorene, N,N'-bis(3-methylphenyl)-N,N'-bis(phenyl)-9,9-dimethyl-fluorene, N,N'-bis(3-methylphenyl)-N,N'-bis(phenyl)-9,9-diphenyl-fluorene, N,N'-bis(naphthalen-1-yl)-N,N'-bis(phenyl)-9,9-diphenyl-fluorene, N,N'-bis(naphthalen-1-yl)-N,N'-bis(phenyl)-2,2'-dimethylbenzidine, 2,2',7,7'-tetrakis(N,N-diphenylamino)-9,9-spirobifluorene, 9,9-bis[4-(N,N-bis-biphenyl-4-yl-amino)phenyl]-9H-fluorene, 9,9-bis[4-(N,N-bis-naphthalen-2-yl-amino)phenyl]-9H-fluorene, 9,9-bis[4-(N-naphthalen-1-yl-N-phenylamino)-phenyl]-9H-fluorene, 2,2',7,7'-tetrakis[N-naphthalenyl(phenyl)-amino]-9,9-spirobifluorene, N,N'-bis(phenanthren-9-yl)-N,N'-bis(phenyl)-benzidine, 2,2'-bis[N,N-bis(biphenyl-4-yl)amino]-9,9-spirobifluorene, 2,2'-bis(N,N-di-phenyl-amino)-9,9-spirobifluorene, Di-[4-(N,N-ditolyl-amino)-phenyl]cyclohexane, N,N,N',N'-tetra-naphthalen-2-yl-benzidine, N,N,N',N'-tetra-(3-methylphenyl)-3,3'-dimethylbenzidine, N,N'-di (naphthalenyl)-N,N'-di(naphthalen-2-yl)benzidine, N,N,N', N'-tetra-naphthalenyl-benzidine, N,N'-di(naphthalen-2-yl)-N,N'-diphenylbenzene-1,4-diamine, N1,N4-diphenyl-N1, N4-di-m-tolylbenzene-1,4-diamine, N2,N2,N6,N6-tetraphenylnaphthalene-2,6-diamine, Tris(4-(quinolin-8-yl) phenyl)amine, 2,2'-bis(3-(N,N-di-p-tolylamino)phenyl) biphenyl, Poly[(9,9-dioctylfluorenyl-2,7-diyl)-co-(4,4'-(N-(4-secbutylphenyl)diphenylamine)], 1,3-bis(N-carbazolyl) benzene, 4,4'-bis(N-carbazolyl)-1,1'-biphenyl, 1,4-bis (diphenylamino)benzene, N,N'-bis(3-methylphenyl)-N,N'-diphenylbenzidine, copper(II) phthalocyanine, 4-(dibenzylamino)benzaldehyde-N,N-diphenylhydrazone, copper(II) phthalocyanine, 4-(dibenzylamino)benzaldehyde-N,N-diphenylhydrazone, 4-(dimethylamino)benzaldehyde diphenylhydrazone, N,N'-di-[(1-naphthyl)-N,N'-diphenyl]-1,1'-biphenyl)-4,4'-diamine, 4-(diphenylamino)benzaldehyde diphenylhydrazone, N,N'-diphenyl-N,N'-di-p-tolylbenzene-1,4-diamine, 9-ethyl-3-carbazolecarboxaldehyde diphenylhydrazone, poly[bis(4-phenyl)(2,4,6-trimethylphenyl)amine], poly(copper phthalocyanine), tetra-N-phenyl-benzidine, anyl phthalocyanine, tris(4-carbazoyl-9-ylphenyl) amine, tris[4-(diethylamino)phenyl]amine, 1,3,5-tris (diphenylamino)benzene, 1,3,5-tris(2-(9-ethylcabazyl-3) ethylene)benzene, 1,3,5-tris[(3-methylphenyl)phenylamino] benzene, and tri-p-tolylamine.

The term "electron transporting agent" or "electron transporting compound," as described herein, may include an organic derivative, or ligand, optionally in the presence of one or more metals such as aluminum, zinc, beryllium, and gallium. Illustrative organic derivatives include an oxadiazoles, phenanthrolines, triazines, triazoles, quinolinols, pyridines, phenanthrolines, diphenylquinones, perylenes, oxadiazoles, thiophenes, triazoles, thiadiazoles, quinoxalines, benzazoles, pyrazols, perfluorated phenylenes, triazines, pyrazines, benzoquinolines, imidazopyridines, and combinations thereof.

The term "luminescent agent" or "luminescent compound," as described herein, may include a derivative or structural unit that can be excited to generate a fluorescence or phosphorescence. Examples of luminescent structural units include: 9,9-disubstituted fluorenes such as, but not limited to, 9,9-dialkylfluorenes, 9,9-diarylfluorenes, and 9,9-aralkylfluorenes; 9-substituted fluorenes; spirofluorenes; phenylenes such as, but not limited to, 2,5-dialkoxyphenylene and 2,5-dialkylphenylene; phenylenevinylenes such as, but not limited to, 2-methoxyl-5-(2'-ethylhexyl)phenylenevinylene, 2,5-dioctyloxy-1,4-phenylenevinylene, 2-silyl-1,4-phenylenevinylene, 2,5-disilyl-1,4-phenylenevinylene and 2,5-dialkyl-1,4-phenylenevinylene; thiophenes; 3-alkylthiophenes; thiophenevinylenes; pyrroles; acetylenes; diacetylenes; anilines; N-vinylcarbazoles; and combinations of any two or more thereof.

The term "sensing material," as described herein, encompasses any organic or inorganic material that facilitates detection. Representative sensing materials include piezoelectric, phosphorescent, fluorescent, absorbent, and pH sensitive materials.

The term "high index material," as described herein, includes a material that has a refractive index greater than about 1.50. The refractive index of a material, such as a polymer, is generally based on several factors which include polarizability, chain flexibility, molecular geometry and the polymer backbone orientation. In certain embodiments, a high index material is selected from brominated organic compounds or polymers, titanium oxide, zinc oxide, diamond, gallium (III) phosphide, or silicon.

In one aspect, a co-polymer is provided having a pendant dioxaborinane moiety, and a polymerizable moiety through which the compound is polymerized. The co-polymer includes a polymerization product of a first monomer having a polymerizable group $PG^1$ and a second monomer, where the second monomer is represented by Formula I:

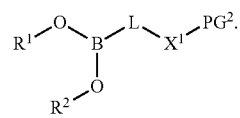

I

In Formula I, L may be absent, alkylenyl, alkenylenyl, or arylene, where the alkylenyl and alkenylenyl are optionally interrupted with one or more oxygen or sulfur atoms; $X^1$ may be absent, amino, oxo, thio, or phosphino; $PG^2$ is a polymerizable group; $R^1$ and $R^2$ are independently H, alkyl, alkenyl, aryl, $C(O)R^3$, $C(O)OR^3$, $C(O)NHR^3$, or $R^1$ and $R^2$ together with the oxygen atoms to which they are bonded join to form a 5- or 6-membered ring; and $R^3$ is H, alkyl, alkenyl, or aryl, where the alkyl and alkenyl are optionally interrupted with one or more oxygen or sulfur atoms; with the proviso that if L and $X^1$ are both absent, and $R^1$ and $R^2$ form a 5- or 6-membered ring, then $PG^2$ is not a vinyl group.

In some embodiments, the first monomer includes a polymerizable group, $PG^1$, which is configured to polymerize with $PG^2$. In some embodiments, $PG^1$ is acrylyl, methacrylyl, epoxyl, isocycanyl, styrenyl, vinyl, oxyvinyl, thiovinyl, ketovinyl, ketoalkyl, ketoalkoxy, ketoaryl, or cycloalkenyl. In other embodiments, the first monomer is an acrylate or a methacrylate. In one embodiment, the first monomer may be represented as a group of Formula VI:

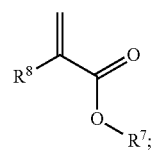

VI where: $R^7$ is H; $C_1$-$C_{22}$ alkyl; aryl; or a metal ion; and $R^8$ is H; CN; $CF_3$; $CH_3$; or phenyl.

The co-polymer may include the polymerization product of the first monomer and the second monomer, as described above, in any ratio. In one embodiment, the co-polymer may include from about 0.1% to about 25% of the polymerization product of the second monomer. In another such embodiment, the co-polymer may include from about 1% to about 15% of the polymerization product of the second monomer. In one such embodiment, the co-polymer may include from about 5% to about 10% of the polymerization product of the second monomer.

In any of the above embodiments, $PG^2$ may be acrylyl, methacrylyl, epoxyl, isocycanyl, styrenyl, vinyl, oxyvinyl, thiovinyl, ketovinyl, ketoalkyl, ketoalkoxy, ketoaryl, or cycloalkenyl. In some embodiments, $PG^2$ is $C(O)C(R^5)$ =$CH_2$, $C(O)CH$=$CH_2$, O—CH=$CH_2$, S—CH=$CH_2$, N=C=O,

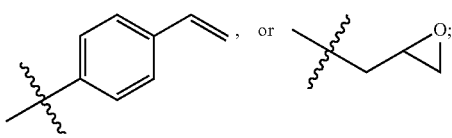

and $R^5$ is a $C_1$-$C_8$ alkyl. In other embodiments, $PG^2$ is $C(O)C(R^5)=CH_2$ and $R^5$ is H; $C_1$-$C_8$ alkyl, aryl, or CN. In one embodiment, $PG^2$ is $C(O)CH=CH_2$.

Illustrative groups for $X^1$ include NH, O, and S.

In some embodiments of the second monomer, L is $C_1$-$C_{10}$ alkylene or arylene. In one embodiment, L is:

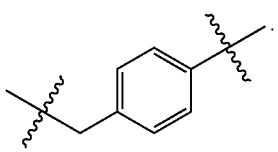 [SMILES: *Cc1ccc(*)cc1]

In some embodiments of the second monomer, $R^1$ is H and $R^2$ is H. In other embodiments, $R^1$ is $C_1$-$C_6$ alkyl and $R^2$ is $C_1$-$C_6$ alkyl. In some embodiments, $R^1$ and $R^2$ together with the oxygen atoms to which they are bonded join to form

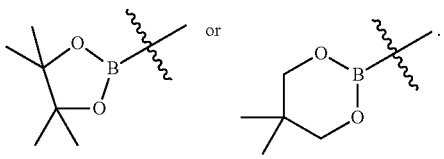

In some embodiments, the co-polymer has a weight average molecular weight of about 5,000 g/mol to about 2,000,000 g/mol. In other embodiments, the co-polymer has a weight average molecular weight of about 5,000 g/mol to about 1,000,000 g/mol. In some embodiments, the co-polymer has a weight average molecular weight of about 10,000 g/mol to about 500,000 g/mol. In other embodiments, the co-polymer has a weight average molecular weight of about 20,000 g/mol to about 100,000 g/mol.

In another aspect, a co-polymer is provided having a structure represented by Formula II:

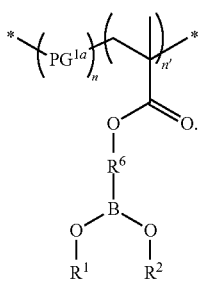

In Formula II, $PG^{1a}$ is the polymerization product of polymerization group $PG^1$; $R^6$ is an alkylene or arylene group; and n and n' represent the repeat units of the co-polymer. $R^1$ and $R^2$ are as described above for Formula I.

In some embodiments, the co-polymer having a structure represented by Formula II has a weight average molecular weight of about 5,000 g/mol to about 2,000,000 g/mol. In other embodiments, the co-polymer has a weight average molecular weight of about 5,000 g/mol to about 1,000,000 g/mol. In some embodiments, the co-polymer has a weight average molecular weight of about 10,000 g/mol to about 500,000 g/mol. In other embodiments, the co-polymer has a weight average molecular weight of about 20,000 g/mol to about 100,000 g/mol.

Many co-polymers gradually degrade upon direct or indirect exposure to ultraviolet and/or visible light. However, the above co-polymers are generally stable to ultraviolet and visible light. As such, the co-polymers may be incorporated into articles with little or no quantities of "ultraviolet/visible absorption agents" that are commonly added to articles to protect a co-polymer from degradation. Ultraviolet/visible absorption agents dissipate the energy from absorbed light, thus reducing the absorption of ultraviolet/visible rays by the co-polymer, and reducing the rate of co-polymer degradation. Typical ultraviolet/visible absorption agents include compounds having a moiety selected from an oxanilide, benzophenone, benzotriazole, or hydroxyphenyltriazine. In certain embodiments, an article containing the co-polymer does not include an ultraviolet/visible absorption agent. In other embodiments, an article containing the co-polymer of any of the above embodiments has less than 1% wt/wt of an ultraviolet/visible absorption agent relative to the weight of the co-polymer. In certain embodiments, an article containing the co-polymer has less than 0.1% wt/wt of an ultraviolet/visible absorption agent. In other embodiments, an article containing the co-polymer has less than 0.01% wt/wt of an ultraviolet/visible absorption agent.

In another aspect, an article is provided that includes the co-polymer of any of the above embodiments, where the article may be flexible or stretchable. For example, conical mandrel testing (e.g., according to ASTM D522) may be used to measure the flexural strength or flexure stiffness of the co-polymer of any of the above embodiments by bending the co-polymer over a conical shaped mandrel. In some embodiments, the article bends with a diameter of at least 0.5 inches (1.3 centimeters (cm)) upon conical mandrel testing. In some embodiments, the article bends with a diameter of at least 1.0 inches (2.5 cm) upon conical mandrel testing. In some embodiments, the article bends with a diameter of at least 1.8 inches (4.8 cm) upon conical mandrel testing. In some embodiments, the article bends with a diameter of at least 2.5 inches (6.4 cm) upon conical mandrel testing. In some embodiments, the article bends with a diameter of at least 4.0 inches (10.2 cm) upon conical mandrel testing. In some embodiments, the article bends up to 15 degrees from its unbent position. In other embodiments, the article bends up to 30 degrees from its unbent position. In some embodiments, the article bends up to 45 degrees from its unbent position. In other embodiments, the article bends up to 90 degrees from its unbent position. In other embodiments, the article bends at least 90 degrees from its unbent position.

Alternatively, tensiometer testing, or any other flexural bending test, can be used by one of skill in the art to measure (e.g., according to ASTM D-747) the elasticity and elongation of the co-polymer of any of the above embodiments. In some embodiments, an article is provided that includes the co-polymer of any of the above embodiments, where the length of the article stretches by at least 1% upon tensiometer (e.g., Instron® tensiometer) testing. In some embodiments, the length of the article stretches by at least 5% upon tensiometer testing. In some embodiments, the length of the article stretches by at least 10% upon tensiometer testing. In some embodiments, the length of the article stretches by at least 50% upon tensiometer testing. In some embodiments, the length of the article stretches by at least 100% upon tensiometer testing. In some embodiments, the length of the article stretches by at least 1,000% upon tensiometer testing. In some embodiments, the length of the article stretches by at least 10,000% upon tensiometer testing.

In another aspect, an article is provided that includes any of the above co-polymers, where the article is a component of an electronic system. For example, the electronic system can be a user interface, display, sensor, medical device, audio device, video device, gaming device, or robotic device. In other embodiments, the article is a user interface.

As noted above, in another aspect, a process is provided of preparing a co-polymer. The process includes polymerizing a first monomer having a polymerizable group $PG^1$ with a second monomer represented by Formula I to form a first co-polymer having a boronate pendant group.

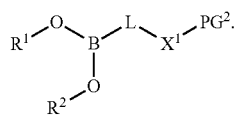

I

In Formula I, L is absent, or is alkylenyl, alkenylenyl, or arylene, optionally interrupted with one or more oxygen or sulfur atoms; $X^1$ is absent, or is amino, oxo, thio, or phosphino; $PG^2$ is a polymerizable group; $R^1$ and $R^2$ are independently H, alkyl, alkenyl, aryl, —C(O)$R^3$, —C(O)O$R^3$, —C(O)NH$R^3$, or $R^1$ and $R^2$ together with the oxygen atoms to which they are bonded join to form a 5- or 6-membered ring; $R^3$ is H, alkyl, alkenyl, or aryl optionally interrupted with one or more oxygen or sulfur atoms; and the boronate pendant group is represented by Formula III:

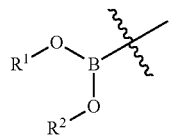

III

In Formula III, $R^1$ and $R^2$ are as described above for Formula I.

In some embodiments, $PG^1$ and $PG^2$ may independently be acrylyl, methacrylyl, epoxyl, isocycanyl, styrenyl, vinyl, oxyvinyl, thiovinyl, ketovinyl, ketoalkyl, ketoalkoxy, ketoaryl, or cycloalkenyl. In some embodiments, $PG^1$ and $PG^2$ may independently be acrylyl, methacrylyl, epoxyl, isocycanyl, styrenyl, vinyl, oxyvinyl, thiovinyl, ketovinyl, ketoalkyl, ketoalkoxy, ketoaryl, or cycloalkenyl.

In some embodiments, the process may further include displacing the boronate pendant group with a group $R^4$, where $R^4$ is alkyl, alkenyl, aryl, or heteroaryl. In other embodiments, $R^4$ may be phenyl or substituted phenyl. In other embodiments, $R^4$ may be an arylamine. In some embodiments, $R^4$ may be a hole transport moiety, an electron transport moiety, a sensing moiety, a high index moiety, or a luminescent moiety. In other embodiments, $R^4$ is:

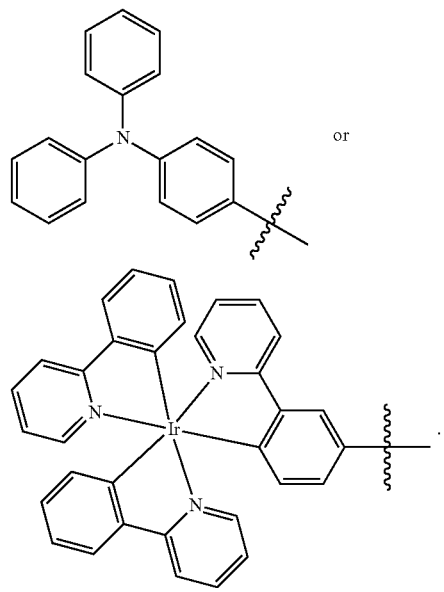

In some embodiments, the first monomer may be an acrylate or a methacrylate. For example, the first monomer is represented as a group of Formula VI:

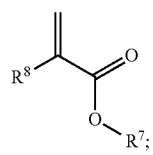

VI where $R^7$ is H, $C_1$-$C_{22}$ alkyl, aryl, or a metal ion; and $R^8$ is H, CN, $CF_3$, $CH_3$, or phenyl.

The polymerizing step may also include activating the polymerizable group. For example, activating the polymerizable group may include heating the polymerizable group, applying ultraviolet irradiation to the polymerizable group, adding a thermal initiator to the polymerizable group, or adding a photochemical initiator to the polymerizable group. Where activating the polymerizable group includes adding a thermal initiator to the polymerizable group, the thermal initiator may include, but is not limited to, 4,4-azobis(4-cyanovaleric acid), 1,1'-azobis(cyclohexanecarbonitrile), 2,2'-azobisisobutyronitrile, benzoyl peroxide, tert-butyl peracetate, lauroyl peroxide, or dicumyl peroxide. Where the activating the polymerizable group includes adding a photochemical initiator to the polymerizable group, the initiator may include, but is not limited to, 3-butyl-2-[5-(1-butyl-3,3-dimethyl-1,3-dihydro-indol-2-ylidene)-penta-1,3-dienyl]-1,1-dimethyl-1H-benzo[e]indolium triphenylbutylborate, 3-butyl-2-[5-(3-butyl-1,1-dimethyl-1,3-dihydro-benzo[e]indol-2-ylidene)-penta-1,3-dienyl]-1,1-dimethyl-1H-benzo[e] indolium triphenylbutylborate, or 6-hydroxy-2,4,5,7-tetraiodo-3-oxo-9,9a-dihydro-3H-xanthene-9-carbonitrile. In some embodiments, the step of activating the polymerizable group includes heating the polymerizable group to a temperature of about 40° C. to about 120° C.

Polymerization of the co-polymer of Formula I may be promoted by conventional means. In certain embodiments, the polymerization includes activating the polymerizable group. In other embodiments, activating the polymerizable group includes heating, UV activation, adding a thermal initiator, or adding a photochemical initiator. In certain embodiments, the in-situ polymerization is promoted through the application of heat. In certain embodiments, the in-situ polymerization is promoted by adding a thermal initiator.

In another aspect, a process is provided for preparing a co-polymer. The process includes providing a first monomer having a polymerizable group $PG^1$; and providing a second monomer represented by Formula I

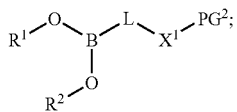

where L may be absent, or is alkylenyl, alkenylenyl, or arylene, optionally interrupted with one or more oxygen or sulfur atoms; $X^1$ is absent, or is amino, oxo, thio, or phosphino; $PG^2$ is a polymerizable group; $R^1$ and $R^2$ are independently H, alkyl, alkenyl, aryl, —C(O)$R^3$, —C(O)O$R^3$, —C(O)NH$R^3$, or $R^1$ and $R^2$ together with the oxygen atoms to which they are bonded join to form a 5- or 6-membered ring; $R^3$ is H, alkyl, alkenyl, or aryl optionally interrupted with one or more oxygen or sulfur atoms; and contacting the second monomer with a compound represented by Formula IV $$R^4\text{-G;} \qquad \qquad IV$$

where $R^4$ is alkyl, alkenyl, aryl, or heteroaryl; and G is a leaving group, such as Cl, Br, I, or —OSO$_2$CF$_3$. Upon contacting, the B(O$R^1$)(O$R^2$) group of the second monomer is displaced by the $R^4$ group from the compound represented by Formula IV to form a third monomer represented by Formula V

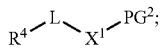

The first and third monomers may then be polymerized to form the co-polymer.

In some embodiments, the process includes polymerizing a first monomer having a polymerizable group $PG^1$, with a second monomer represented by Formula I, to form a first co-polymer having a boronate pendant group, and contacting the first co-polymer having a boronate pendant group with a compound represented by Formula IV, to form a second co-polymer, where the boronate pendant group of the second co-polymer has been at least partially displaced by the $R^4$ group from the compound represented by Formula IV.

The present technology, thus generally described, will be understood more readily by reference to the following Examples, which are provided by way of illustration and are not intended to be limiting of the present technology.

EXAMPLES

It will be appreciated that where reaction conditions (e.g., temperatures, times, mole ratios of reactants, solvents, pressures, etc.) are given, other conditions can also be used unless otherwise stated. Optimum reaction conditions may vary with the particular reactants or solvent used, but such conditions can be determined by one skilled in the art by routine optimization procedures.

Example 1

Synthesis of representative acrylic-dioxaborinane monomers of Formula I, such as (2-(4-(methacryloyloxymethyl)phenyl)-1,3,2-dioxaborinane-5,5-diyl)bis(methylene)dibenzoate Step 1. Synthesis of 2,2-bis(benzoyloxymethyl)-1,3-propanediol To 2,2-dimethyl-1,3-dioxane-5,5-dimethanol (100 mmol) and Et$_3$N (340 mmol) in anhydrous THF at 0° C. was added benzoic acid chloride (220 mmol; 1.1 equiv for each alcohol unit) dropwise over 30 minutes. The reaction was allowed to warm to room temperature and stirred for 15 hours. The crude reaction mixture was evaporated and extracted from MeCl$_2$ (300 mL) and water (500 mL). The extraction was repeated with 2 portions of MeCl$_2$ (100 mL), followed by drying the combined organic layer over Na$_2$SO$_4$, filtering, and evaporating. The crude product, 2,2-bis(benzyloxymethyl)-1,3-propanediol, was purified by chromatography using 1:1 petroleum ether:EtOAc in 98% yield. mp 104-105° C.; $^1$H NMR: 2.76 ppm (bs, 2H), 3.79 (s, 4H), 4.52 (s, 4H), 7.6-8.0, (10H). This procedure can be adapted to accommodate other acid chlorides.

Scheme 1. Representative synthesis of a dioxaborinane intermediate.

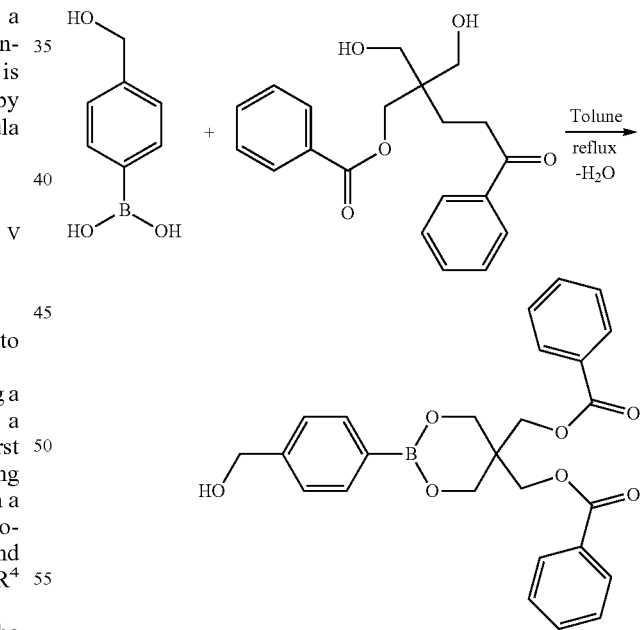

Step 2. Representative Synthesis of a Dioxaborinane Intermediate

To a three neck flask equipped with a Dean-Stark apparatus, and under an inert argon atmosphere, was added 50.0 g (0.329 mol) of 4-(hydroxymethyl)phenylboronic acid in toluene (400 mL). To the solution was added 113.27 g (0.329 mol) of 2,2-bis(benzyloxymethyl)-1,3-propanediol. The solution was then brought to vigorous reflux temperature. Water formed by the reaction was collected by the Dean-Stark apparatus, which also served to monitor the progress of the reaction. Typically, the reaction took four hours to complete. The crude product was taken to the next step without purification

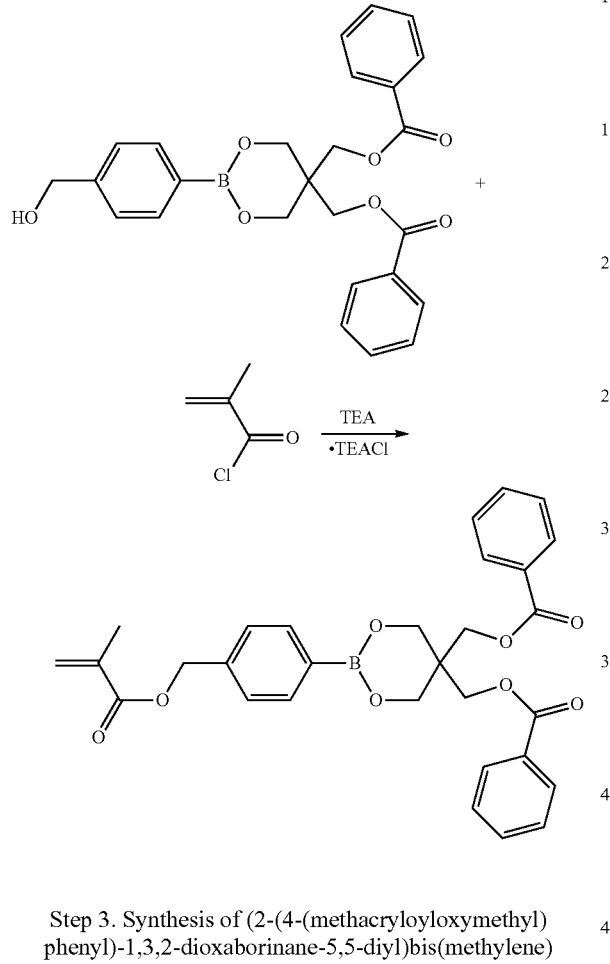

Scheme 2. Representative synthesis of an acrylic monomer of Formula I, such as the monomer shown below.

Step 3. Synthesis of (2-(4-(methacryloyloxymethyl)phenyl)-1,3,2-dioxaborinane-5,5-diyl)bis(methylene) dibenzoate The toluene solution of the alcohol from Step 2 above was cooled to 105° C. and the Dean-Stark trap was removed while a flow of dry argon was applied. The flask was then stoppered and cooled to room temperature. To the toluene solution was added 60 mL of anhydrous triethylamine as the toluene solution with mixing. To the solution was then added 36.2 g (0.346 mol) of methacryloyl chloride. A white precipitate formed and the flask increased in temperature. The solution was allowed to stir for 24 hours at which time the precipitate was filtered off. The toluene was removed by rotary evaporation and the resulting residue was purified by column chromatography using 9:1 ethyl acetate:hexanes. Overall yield exceeded 90%. $^1$H NMR 1.9 ppm (s 3H), 3.8 ppm (s 4H), 4.6 ppm (s 4H), 4.8 ppm (s 2H), 5.6 ppm (d 1H), 6.0 ppm (d 1H), 7.2-7.5 ppm (m), 8.3 ppm (m).

Each of the possible compounds of varying R groups may be prepared by substituting the appropriate diol for the 2,2-bis(benzyloxymethyl)-1,3-propanediol as described for Step 2, above.

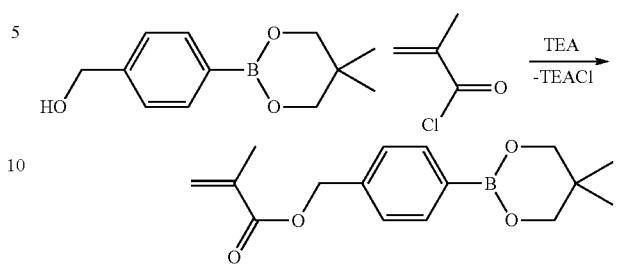

Scheme 3. Representative snythesis of an additional acrylic monomer of Formula I, such as the monomer shown below.

Example 2

Synthesis of 2-methyl-acrylic acid 4-(5,5-dimethyl-[1,3,2]dioxaborinan-2-yl)-benzyl ester Using the synthetic procedures of Steps 1-3 from Example 1, 2-methyl-acrylic acid 4-(5,5-dimethyl-[1,3,2]dioxaborinan-2-yl)-benzyl ester was made from the appropriate starting materials, as shown in Scheme 3. $^1$H NMR 0.6 ppm (s 6H), 2.0 ppm (s 3H), 3.6 ppm (s 4H), 5.2 ppm (s 2H), 5.3 ppm (d 1H), 6.2 ppm (d 1H), 7.4 ppm (m 2H), 8.2 ppm (m 2H).

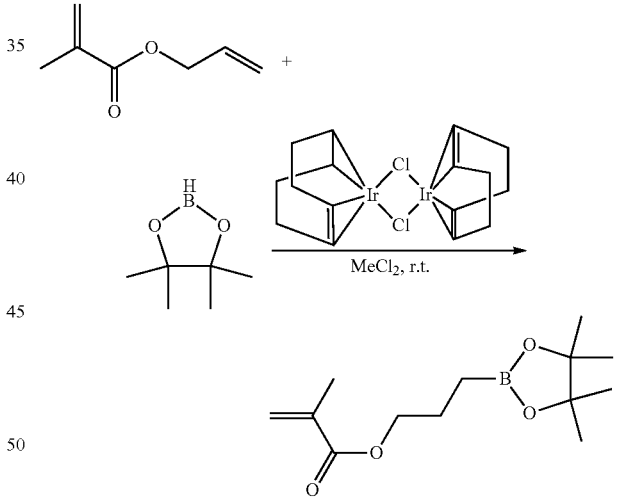

Scheme 4. Representative synthesis of an additional acrylic monomer of Formula I, such as the monomer shown below.

Example 3

Synthesis of 2-methyl-acrylic acid 3-(4,4,5,5-tetramethyl-[1,3,2]dioxaborolan-2-yl)-propyl ester The catalytic hydroboration of allyl methacrylate with pinacolborane was carried out by the following general procedure: A round-bottom flask was charged with [Ir(cyclooctadiene)Cl]$_2$ (2,213 g, 3.29 mmol, 1.5 mol %) and methylenebis(diphenylphosphine) (2.533 g, 6.59 mmol), and was flushed with argon. Anhydrous methylene chloride (100 mL) and pinacolborane (24.365 g) were then cannulated into the flask. Allyl methacrylate was dried over calcium chloride and then extensively purged of oxygen. The allyl methacrylate (23 mL, 21.574 g, 0.171 mol) was then syringed into the methylene chloride solution which was cooled by a water ice bath. The mixture was then stirred at room temperature for 24 hours. The reaction was quenched with methanol (100 mL) and water (100 mL), the product was extracted with ether, and then dried over $MgSO_4$. Chromatography on silica gel with ethyl acetate gave 2-methyl-acrylic acid 3-(4,4,5,5-tetramethyl-[1,3,2]dioxaboralan-2-yl)-propyl ester. $^1H$ NMR 1.0 ppm (m 2H), 1.2 ppm (s 12H), 2.0 ppm (m 2H), 2.4 ppm (s 3H), 4.4 ppm (m 2H), 5.4 ppm (m 1H), 6.4 ppm (m 1H).

Scheme 5. A representative polymerization reaction to form an acrylic-dioxaborinane co-polymer of Formula II, such as the co-polymer shown below.

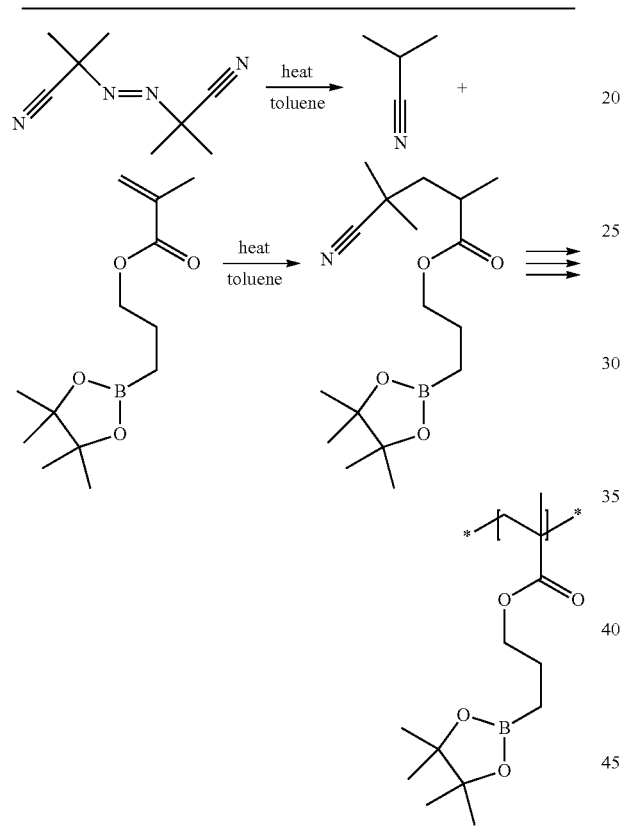

Example 4

Polymerization

Scheme 5 illustrates an exemplary polymerization of 2-methyl-acrylic acid 3-(4,4,5,5-tetramethyl-[1,3,2]dioxaborolan-2-yl)-propyl ester. Alternatively, the acrylic dioxaborinane can be co-polymerized with other monomers. Co-polymerization with monomers such as lauryl methacrylate can lower the glass transition temperature, and provide for polymers with increased flexibility and a greater capacity to stretch. Co-polymerization with monomers such as adamantyl methacrylate can increase the glass transition temperature and makes harder more glass like polymers. Co-polymerizing with other monomer units can incorporate, for example, crosslinking capabilities into the resulting co-polymer.

Scheme 6. The incorporation of a representative hole-transport active moiety into a representative acrylic-dioxaborinane co-polymer of Formula II.

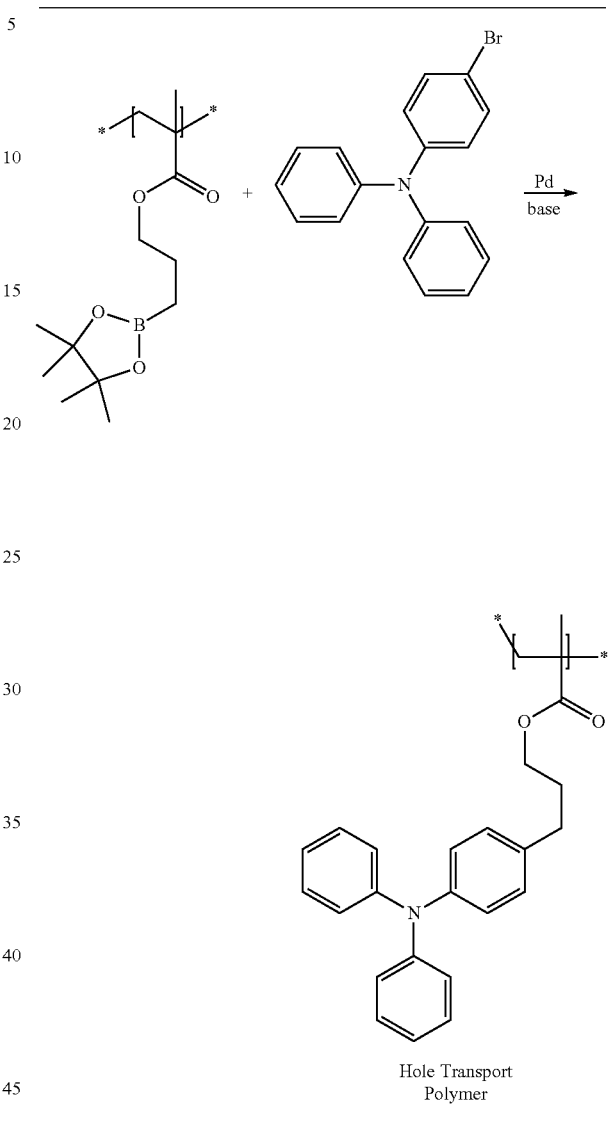

Hole Transport Polymer

Example 5

Incorporation of One or More Active Moieties into the Monomer or Co-Polymer

The resulting acrylic-dioxaborinane co-polymers may be adapted to their particular application by coupling one or more active moieties (e.g., electron transport structures, sensing molecules, and high index materials) into the polymer. Some coupling reactions (e.g., Suzuki couplings) are mediated through a metal catalyst (e.g., palladium-based) and a base, such a potassium carbonate or potassium fluoride. Coupling reactions can be performed with or without water, depending on whether the active moieties are water sensitive. Scheme 6 illustrates a coupling between triphenyl amine and the acrylic polymer to make a hole transport co-polymer media for flexible interfaces.

Scheme 7. The incorporation of a representative luminescent molecule into a representative acrylic-dioxaborinane co-polymer of Formula II.

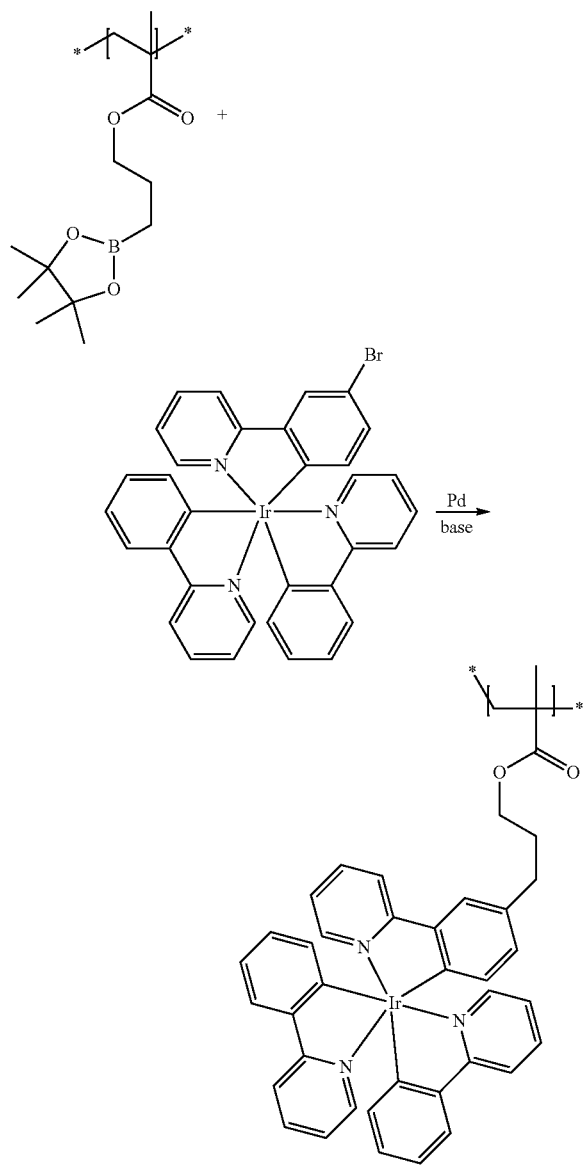

Other types of active moieties, such as electron transport structures, sensing molecules, and high index materials, can be coupled to the co-polymer. Scheme 7 illustrates the incorporation of a luminescent molecule into a representative co-polymer. Such materials are useful as a user interface, organic light-emitting diode (OLED), display, or a replacement for light bulbs, as different emitters can be attached.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A co-polymer comprising a polymerization product of:
   a first monomer: and
   a second monomer represented by Formula I:

$$R^1\text{-O}\diagdown\underset{\text{O-}R^2}{B}\text{-L-}X^1\text{-}PG^2 \qquad \text{I}$$

wherein:
   L is absent, or is alkylenyl, alkenylenyl, or arylene, wherein the alkylenyl and alkenylenyl are optionally interrupted with one or more oxygen or sulfur atoms;
   $X^1$ is absent, or is amino, oxo, thio, or phosphino;
   $PG^2$ is a polymerizable group;
   $R^1$ and $R^2$ are independently H, alkyl, alkenyl, aryl, $C(O)R^3$, $C(O)OR^3$, or $C(O)NHR^3$, or $R^1$ and $R^2$ together with the oxygen atoms to which they are bonded join to form a 5- or 6-membered ring; and
   $R^3$ is H, alkyl, alkenyl, or aryl, wherein the alkyl and alkenyl are optionally interrupted with one or more oxygen or sulfur atoms;
   with the proviso that if L and $X^1$ are both absent, and $R^1$ and $R^2$ form a 5- or 6-membered ring, then $PG^2$ is not a vinyl group.

2. The co-polymer of claim 1, comprising between 0.1% and 25% of the polymerization product of the second monomer.

3. The co-polymer of claim 1, wherein $PG^2$ is acrylyl, methacrylyl, epoxyl, isocycanyl, styrenyl, vinyl, oxyvinyl, thiovinyl, ketovinyl, ketoalkyl, ketoalkoxy, ketoaryl, or cycloalkenyl.

4. The co-polymer of claim 1, wherein $PG^2$ is $C(O)C(R^5)=CH_2$, $C(O)CH=CH_2$, $O-CH=CH_2$, $S-CH=CH_2$, $N=C=O$,

[styrenyl or epoxide structures]

and $R^5$ is a $C_1$-$C_8$ alkyl.

5. The co-polymer of claim 4, wherein $PG^2$ is $C(O)C(R^5)=CH_2$ and $R^5$ is H; $C_1$-$C_8$ alkyl, aryl, or CN.

6. The co-polymer of claim 1, wherein $PG^2$ is $C(O)CH=CH_2$.

7. The co-polymer of claim 1, wherein $X^1$ is NH, O, or S.

8. The co-polymer of claim 1, wherein L is $C_1$-$C_{10}$ alkylene or arylene.

9. The co-polymer of claim 1, wherein L is:

[para-phenylene-methylene structure]

10. The co-polymer of claim 1, wherein $R^1$ is H and $R^2$ is H.

11. The co-polymer of claim 1, wherein $R^1$ is $C_1$-$C_6$ alkyl and $R^2$ is $C_1$-$C_6$ alkyl.

12. The co-polymer of claim 1, wherein $R^1$ and $R^2$ together with the oxygen atoms to which they are bonded join to form a group of formula:

[pinacol boronate and neopentyl boronate structures]

13. The co-polymer of claim 1, wherein the first monomer comprises a polymerizable group, $PG^1$, which is configured to polymerize with $PG^2$.

14. The co-polymer of claim 13, wherein $PG^1$ is acrylyl, methacrylyl, epoxyl, isocycanyl, styrenyl, vinyl, oxyvinyl, thiovinyl, ketovinyl, ketoalkyl, ketoalkoxy, ketoaryl, or cycloalkenyl.

15. The co-polymer of claim 1, wherein the first monomer is an acrylate or a methacrylate.

16. The co-polymer of claim 15, wherein the first monomer is represented as a group of Formula VI:

$$\text{VI}$$

[acrylate structure with $R^8$ and $OR^7$]

wherein:
   $R^7$ is H; $C_1$-$C_{22}$ alkyl; aryl; or a metal ion; and
   $R^8$ is H; CN; $CF_3$; $CH_3$; or phenyl.

17. The co-polymer of claim 1 represented by Formula II:

$$\text{II}$$

[copolymer structure with $PG^{1a}$ and boronate side chain]

wherein:
   $PG^{1a}$ is the polymerization product of polymerization group $PG^1$;
   $R^6$ is an alkylene or arylene group; and
   n and n' represent the repeat units of the co-polymer.

18. An article comprising the co-polymer of claim 1, wherein the article bends with a diameter of at least 1.8 inches (4.8 cm) upon conical mandrel testing.

19. An article comprising the co-polymer of claim 1, wherein the length of the article stretches by at least 5% upon tensiometer testing.

* * * * *